United States Patent
Guest

(10) Patent No.: US 6,173,999 B1
(45) Date of Patent: Jan. 16, 2001

(54) TUBE COUPLING DEVICES

(76) Inventor: John Derek Guest, 'Iona'Cannon Hill Way, Bray, Maidenhead SL6 2EX (GB)

(*) Notice: Under 35 U.S.C. 154(b), the term of this patent shall be extended for 0 days.

(21) Appl. No.: 09/336,290

(22) Filed: Jun. 21, 1999

(30) Foreign Application Priority Data

Jul. 29, 1998 (GB) .................................................. 9816537

(51) Int. Cl.$^7$ .................................................. F16L 21/06
(52) U.S. Cl. .......................... 285/323; 285/351; 285/340
(58) Field of Search .................... 285/340, 323, 285/351

(56) References Cited

U.S. PATENT DOCUMENTS

| | | | |
|---|---|---|---|
| 4,005,883 | 2/1977 | Guest | 285/322 |
| 4,645,246 | 2/1987 | Guest | 285/323 |
| 5,085,472 | 2/1992 | Guest | 285/158 |
| 5,603,530 * | 2/1997 | Guest | 285/340 |
| 5,603,532 * | 2/1997 | Guest | 285/340 |
| 5,692,784 * | 12/1997 | Hama et al. | 285/340 |
| 5,738,387 | 4/1998 | Guest | 285/322 |
| 5,779,284 | 7/1998 | Guest | 285/322 |

FOREIGN PATENT DOCUMENTS 0 819 880 A2   1/1998  (EP) .............................. F16L/37/088

\* cited by examiner

Primary Examiner—Dave W. Arola
(74) Attorney, Agent, or Firm—Baker & Daniels

(57) ABSTRACT

The disclosure relates to a tube coupling device comprising a cylindrical cartridge having a throughway containing a tube locking device for locking a tube inserted into the throughway at one end of the cartridge. The outer side of the cartridge has an encircling rebate at said one end in which a grab ring of V-shaped cross-section is mounted with the V diverging towards said one end. One outer limb of the V projects outwardly of the outer cylindrical surface of the cartridge in its relaxed condition to grip and lock the cartridge in a bore in a further component.

3 Claims, 1 Drawing Sheet

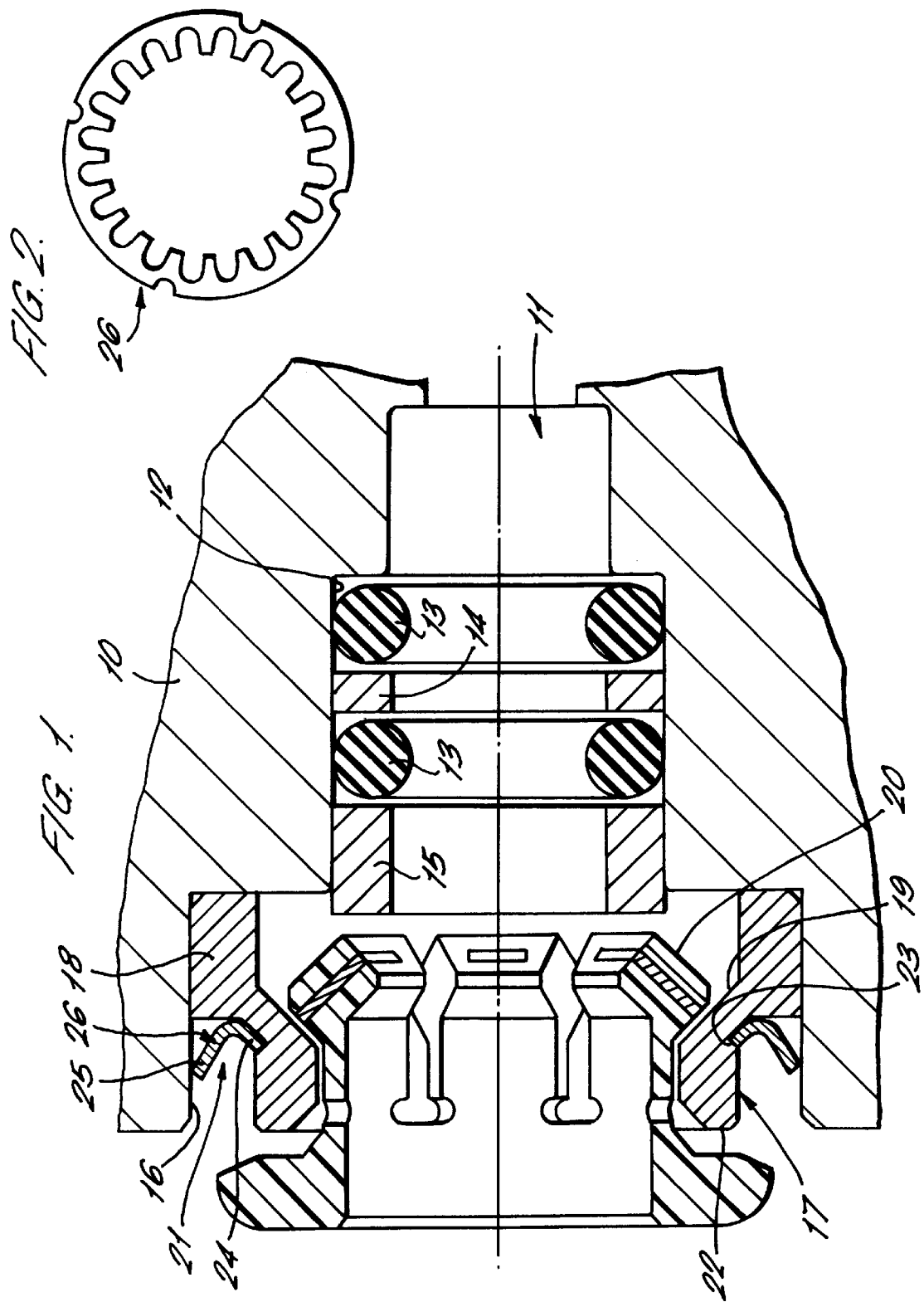

TUBE COUPLING DEVICES

BACKGROUND OF THE INVENTION

1. Field of the Invention

The invention relates to tube coupling devices.

2. Background Prior Art

UK Patent Specification No. 1520742 discloses a coupling body having an internal throughway open at one end to receive a tube with a locking device in the open end of the throughway to lock the tube in the coupling body. UK Patent No. 2172948 discloses a development of that arrangement in which an insert sleeve is mounted in the open end of the throughway in which the tube locking device engages. The sleeve is held in the throughway by means of a spring ring embedded in the sleeve and having an obliquely inclined outer periphery which bears against and grips the surface of the throughway. Because the spring ring is almost entirely embedded in the insert sleeve, its freedom to flex and therefore its ability to cater for any significant tolerance in the diameter of the throughway is restricted.

These problems were addressed in European Patent No. 0373272 in which the coupling body was designed to be mounted in a bore in a housing rather than serve as a free-standing element. The coupling body has an encircling groove and a detent ring with an angled outer periphery is moulded into one side of the groove with the angled outer periphery of the ring extending across the groove and therefore be free to flex to cater for variation of the diameter of the socket. This arrangement provided a secure mounting for a coupling body in a housing but the coupling body is difficult to mould because of the angled outer periphery of the spring ring which makes it difficult to extract tooling for forming the groove. In a further development, the subject of European Patent No. 0751334, a coupling body is formed in two parts, one component having a bore in which the other component is mounted, the latter component having a spring metal ring with outwardly projecting fingers mounted in one side of a groove so that the fingers are bent over as the inner body is inserted into the outer body to retain the inner body in engagement in the outer body. In order to enable the outer ends of the fingers of the rings to be bent over as the inner body is inserted in the outer body, the metal ring has to be made fairly flexible and so the arrangement is more suitable to more lightly loaded components.

European Patent No. 0819880 discloses a tube coupling body of circular external cross-section having an internal throughway open at one end to receive a tube with a locking device in the open end of the throughway to lock a tube in the coupling body, the coupling body having on its outer side an encircling groove spaced from said one end of the body and a grab ring mounted in the groove of V-shaped cross-section facing the axial direction of the ring towards said one end of the coupling body, one limb of the V being lodged in the groove and the other limb projecting from the groove at its free end for gripping engagement in a bore in which the coupling body is inserted.

The grab ring provides a high strength griping device for locking the coupling body in the bore or socket in another component. As such, the arrangement is particularly suitable for use in combination with the high strength collet arrangement described and illustrated in European Patent No. 0764808. The arrangement is however also suitable for use with a wide range of different coupling body mountings.

SUMMARY OF THE INVENTION

This invention provides a tube coupling device comprising a cylindrical cartridge having a throughway containing a tube locking device for locking a tube inserted into the throughway at one end of the cartridge, the outer side of the cartridge having an encircling rebate at said one end in which a grab ring of V-shaped cross-section is mounted with the V diverging towards said one end and one outer limb of the V projecting outwardly of the outer cylindrical surface of the cartridge in its relaxed condition to grip and lock the cartridge in a bore in a further component.

Preferably a recess is formed in the corner of the rebate in which the inner limb of the grab ring is seated.

More specifically the inner limb of the V is relatively short compared to said outer limb and the recess in the corner of the rebate is also V-shaped to receive and trap said inner limb of the V-shaped ring to hold the ring on the cartridge.

In any of the above arrangements, the inner limb of the ring may be formed with spaced teeth around its periphery to allow the limb to flex as it is engaged in the rebate on the cartridge.

BRIEF DESCRIPTION OF THE DRAWINGS

The following is a description of a specific embodiment of the invention, reference being made to the accompanying drawings in which:

FIG. 1 is a cross-sectional view through a tube coupling cartridge and component assembly; and FIG. 2 is a detailed view of a grab ring of the coupling.

DESCRIPTION OF THE PREFERRED EMBODIMENTS

Referring to the drawings, there is shown a component 10 having a throughway 11 which is open at one end of the component. The throughway is stepped up to a first increased diameter bore 12 in which a pair of 'O' ring seals 13 are mounted with a spacer 14. A sleeve 15 is mounted in the end of the bore to keep the seals in place.

At the end of the component the throughway is stepped up to a second increased diameter bore 16 in which a tube coupling cartridge assembly indicated generally at 17 is mounted.

The cartridge assembly comprises a cylindrical cartridge 18 engaged in the bore 16, having a tapered internal cam surface 19 and a tube locking collet 20 engaging the cam surface. The construction of the collet and its operation are described in European Patent No. 0764808 to which reference should be made.

The cartridge 18 has a deep encircling rebate 21 at the outwardly facing end 22 with a V-shaped recess 23 in the inner corner of the rebate. A steel V-shaped cross-section grab ring 26 is mounted in the rebate. The ring has one inner short limb 24 which is trapped in the U-shaped recess 23 at the inner corner of the rebate to hold the ring on the cartridge. The ring has a long outer limb 25 which projects outwardly of the rebate in its relaxed condition to bear against the bore 16 in which the cartridge is located to lock the cartridge in the bore.

The inner limb 24 of the ring 26 may have teeth around its periphery to increase the flexibility of the ring allowing it to be snapped into the recess 23. The outer limb 25 may also have spaced slots or notches to increase its flexibility if required.

What is claimed is:

1. A tube coupling comprising:

a cylindrical cartridge having a throughway, one end, and an outer cylindrical surface, said throughway having a tube locking device disposed therein for locking a tube inserted into said throughway;

an encircling groove in said outer cylindrical surface, said groove facing towards said one end, said groove defining a raised portion on said outer cylindrical surface, said groove further defining an inclined seat;

a continuous grab ring disposed in said groove, said ring V-shaped in cross-section, said V divergent toward said one end, said grab ring having an outer limb and an inner limb, said outer limb projecting outwardly from said outer cylindrical surface in a relaxed position of said ring to grip and lock said cartridge in a bore, said inner limb engaging said inclined seat, said inner limb having spaced teeth around its periphery, said teeth adapted to flex to allow said ring to be forced over and along said raised portion whereby said ring may be locked into said groove with said inner limb disposed in said inclined seat.

2. A tube coupling device as claimed in claim 1, where a recess is formed in the corner of the groove in which said inner limb of the grab ring is seated.

3. A tube coupling device as claimed in claim 2, wherein said inner limb of the V is relatively short compared to said outer limb and the recess in the corner of the groove is also V-shaped to receive and trap said inner limb of the V-shaped ring to hold the ring on the cartridge.

\* \* \* \* \*

UNITED STATES PATENT AND TRADEMARK OFFICE
CERTIFICATE OF CORRECTION

PATENT NO. : 6,173,999 B1
DATED : January 16, 2001
INVENTOR(S) : John Derek Guest It is certified that error appears in the above-identified patent and that said Letters Patent is hereby corrected as shown below:

Please delete the Abstract and insert therefore the following Abstract:

-- A tube coupling device including a cylindrical cartridge having a throughway therein which contains a tube locking device for locking a tube inserted into the throughway at one end of the cartridge. The outer side of the cartridge has an encircling groove at the one end in which a grab ring of V-shaped cross-section is mounted with the V diverging towards said one end. One outer limb of the V projects outwardly of the outer cylindrical surface of the cartridge in its relaxed condition to grip and lock the cartridge in a bore in a further component. --

Signed and Sealed this

Twenty-eighth Day of August, 2001

Attest:

*Nicholas P. Godici*

NICHOLAS P. GODICI
*Attesting Officer*      *Acting Director of the United States Patent and Trademark Office*